Jan. 3, 1967 C. J. KNERR 3,296,465
CONTROL ARRANGEMENT FOR A HOUSEHOLD APPLIANCE
Filed Jan. 29, 1963 4 Sheets-Sheet 1
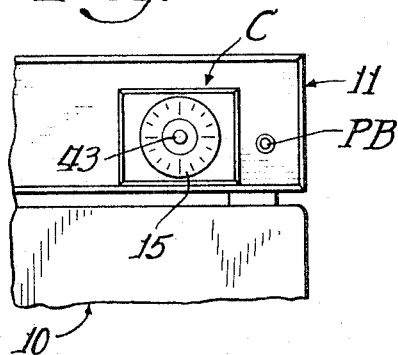
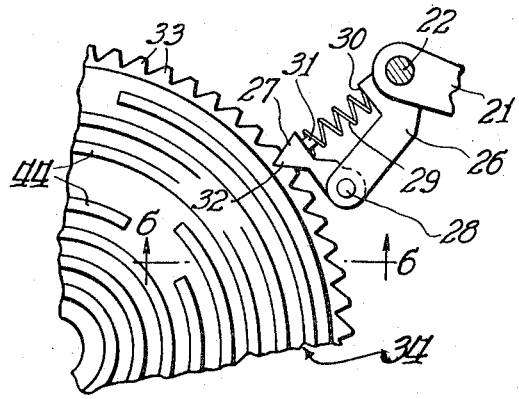
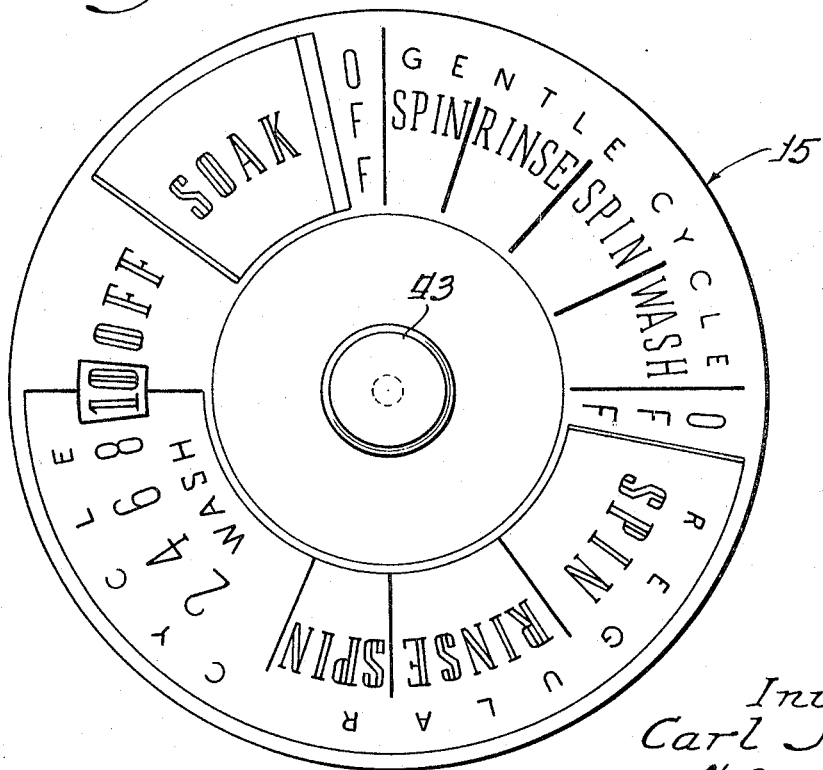
Inventor:
Carl J. Knerr
By H. J. Schmid Atty Jan. 3, 1967 C. J. KNERR 3,296,465
CONTROL ARRANGEMENT FOR A HOUSEHOLD APPLIANCE
Filed Jan. 29, 1963 4 Sheets-Sheet 2
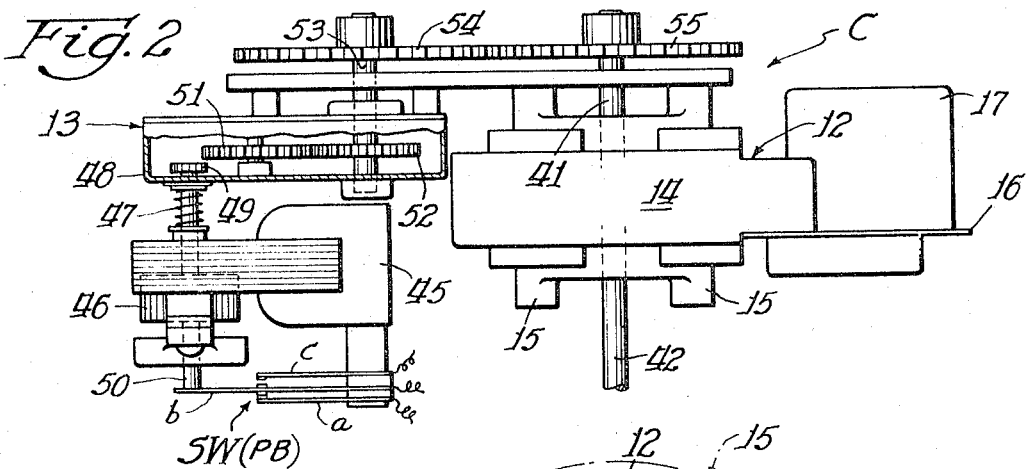
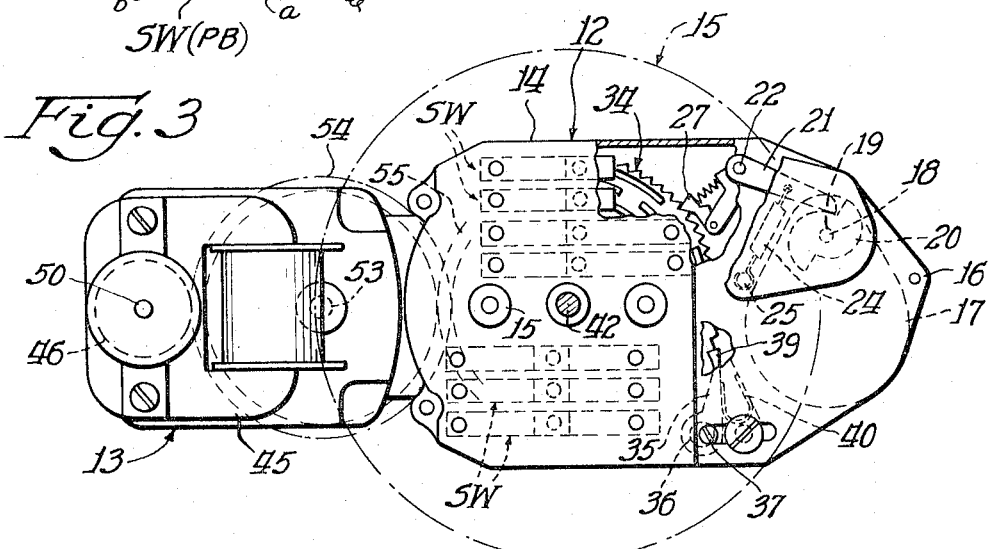
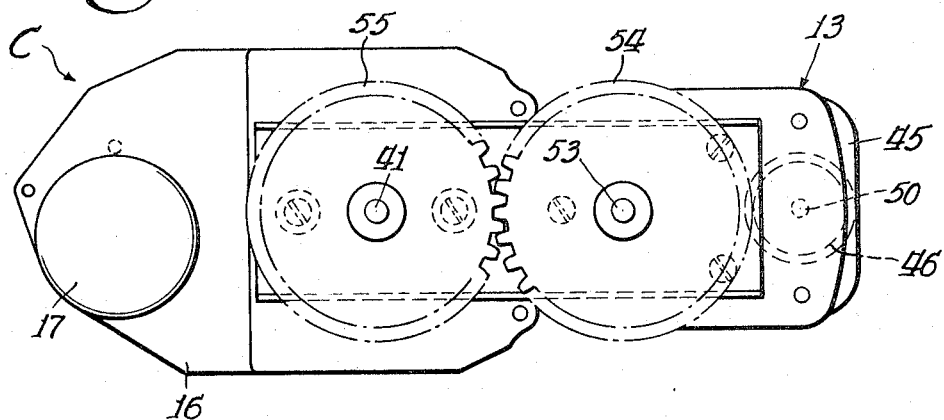
Inventor:
Carl J. Knerr
By: H. J. Schmid Atty

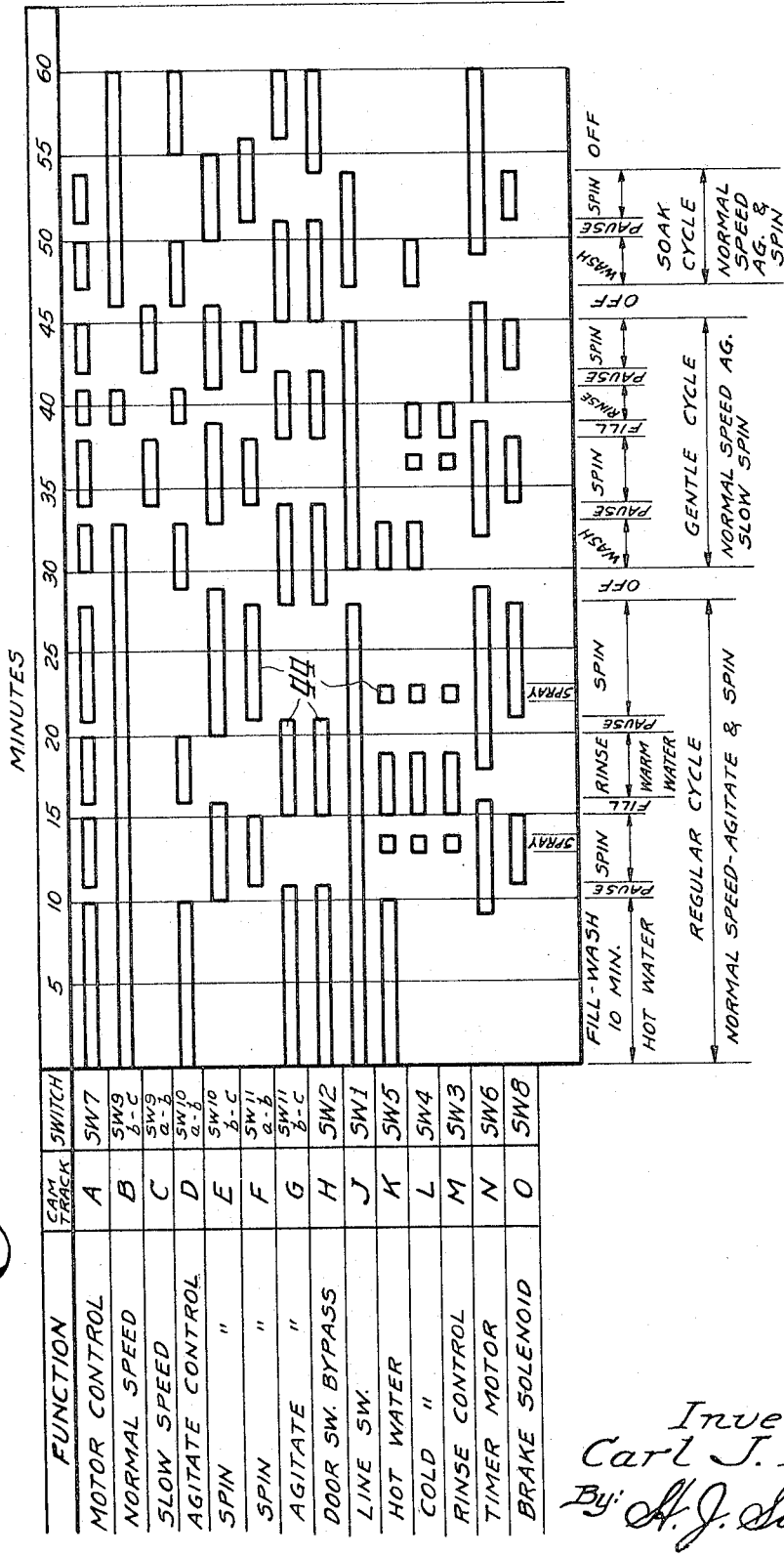

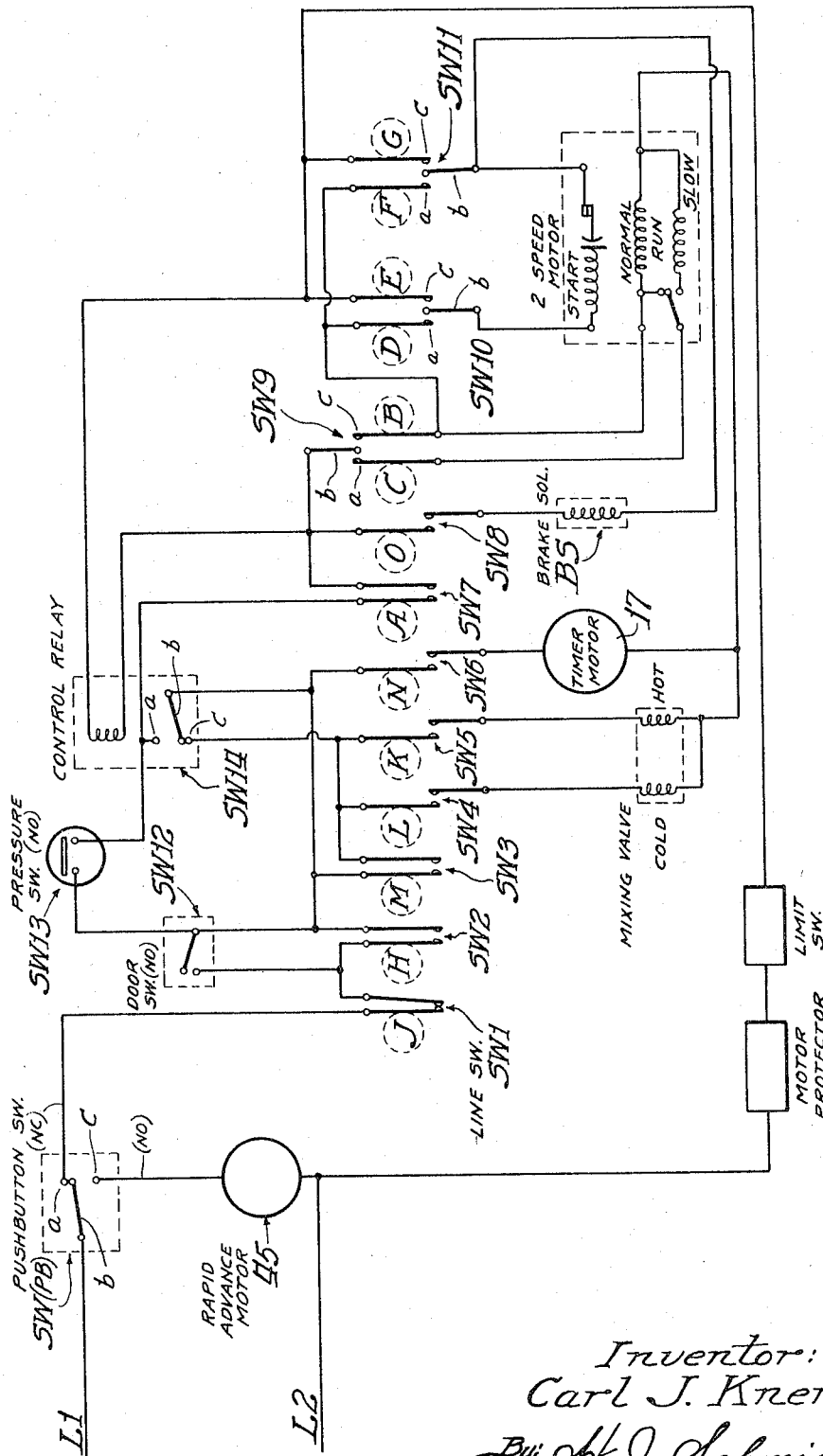

United States Patent Office 3,296,465
Patented Jan. 3, 1967

3,296,465
CONTROL ARRANGEMENT FOR A
HOUSEHOLD APPLIANCE
Carl J. Knerr, Herrin, Ill., assignor to Borg-Warner
Corporation, Chicago, Ill., a corporation of Illinois
Filed Jan. 29, 1963, Ser. No. 254,640
15 Claims. (Cl. 307—141)

This invention relates to program selector controls for domestic appliances and more particularly to program selector controls for controlling the time sequence of operations of domestic appliances, such as laundry machines.

In an automatic washing machine, for example, it is customary and desirable to provide one or more complete cycles of operation adapted to correspond to the type or types of material and character of the apparel being processed. For this purpose, control arrangements provide for the selection of individual timing steps for washing, rinsing, and extraction of a complete cycle of operation particularly adapted to the nature of the material being treated, or, alternatively, selection of one of several complete cycles of operation, i.e. programs, having different predetermined time periods of the washing, or rinsing, and extraction steps necessary for best cleaning treatment of different materials and/or apparel. In the types of control arrangements, it is desirable to pre-select the proper individual timing factors for the washing, rinsing, and extraction steps and then energize a control to automatically sequentially provide performance of the machine. In the second timer control arrangement, the operator selects the desired program and initiates operation of the machine, the control automatically providing for the proper time periods for washing, rinsing, and extraction. In either of these types of control arrangements, once the operator has made the selection and the control becomes operative to perform one of the several programs (or a program providing pre-selected individual time periods) and thereafter, during operation of the control, deviations or changes are desired by the operator to vary the time periods of the program, or to select a different program than the previously selected program, may be unattainable, or cannot readily or expeditiously be made by the operator. It may be noted, in this regard, that it is common practice to provide for pre-selection of one of several programs, or the time periods of washing, rinsing, and extraction of a single program, by pushbuttons pre-setting cams to actuate switches of a control timing device, and to energize the timing device to provide the selected operation. It is also observed a rapid advance mechanism may be used to advance the cams to initial setting of the timer control and to thereafter energize the timer control automatically, in one of the above cases, to provide the pre-selected sequence of timed operations of a program, or to initiate operation of a selected program among several programs.

An object of the invention is to provide a new and improved control arrangement for domestic appliances in which any of multiplicity of automatic sequential operations of the domestic appliances may be varied or changed at the will of the operator during performance of the appliance.

Another object of the invention is to provide a new and improved control arrangement for domestic appliances having either a single program providing automatically and sequentially definite timed periods of operations, or a plurality of such programs, and featuring means for varying or changing the time periods of the single program, or changing a previously selected program to another program at any time, during the performance of the domestic appliance.

Another object of the invention is to provide a new and improved control arrangement for domestic appliances having a program controller providing automatic and sequential definite time periods of operation, or having a controller providing a plurality of such programs, the control arrangement featuring means for disabling the controller at any time by the operator to modify or change the periods of operation of a program, or to change to another program from the previously selected program.

A further object of the invention is to provide a new and improved control arrangement for domestic appliances having a program controller for automatically and sequentially providing timed periods of different operations of the appliances, the controller comprising an electrically-energizable timer having a motor rotating a plurality of cams operating switches to energize or de-energize the electrically-controlled components of the appliances in accordance with a desired program and featuring operator-controlled means for deenergizing the timer motor and to initiate operation of means for rapidly advancing the cams to any of their several positions to vary the time of any period of the normal program, or to select a different program than the initial previously selected program, so that the operator has complete control and selection of any and all operations of the controller, and thereby the operations of the appliance, during performance of the appliance.

These and other objects and advantages of the invention will become apparent upon consideration of the following detailed description taken in conjunction with the accompanying drawings in which:

FIG. 1 is a front elevational view of a portion of a washing machine embodying the control of the present invention;

FIG. 2 is a top plan view of the control including a sequential controller and associated rapid advance structure;

FIG. 3 is a rear elevational view of the control;

FIG. 4 is a front elevational view of the control;

FIG. 5 is an enlarged view of the cam and pawl mechanism of the sequential controller shown in FIG. 3;

FIG. 6 is a sectional view of the cam shown in FIGS. 3 and 5 taken substantially along line 6—6 of FIG. 5;

FIG. 7 is a face view of the dial of the control, the dial having indicia defining different programs, and also the cycles of operation of the washing machine for respective different programs;

FIG. 8 is a diagrammatic timing chart indicating the sequence relationship of the various cams and their periodicity and duration with respect to the cycles of operations of different programs; and FIG. 9 is a diagrammatic illustration of the electrical control circuits for the washing machine.

Referring now to the drawings, FIG. 1 illustrates a fragmentary portion of a washing machine which may be of the type shown and described in U.S. Patent 2,807,951 issued October 1, 1957 to A. H. Gerhardt et al. and having electrical and mechanical components providing for washing, rinsing, and spin drying of clothing or other fabrics requiring cleaning. More particularly, FIG. 1 illustrates portions of the cabinet 10 and a backguard 11 in which is located the control, generally indicated at C, of the present invention illustrated in FIGS. 2–7, inclusive.

The control C comprises a sequential controller or timer 12, and a rapid advance structure 13 associated with the timer 12 and operative to influence the setting of the timer to provide various programs generally indicated "Soak," "Gentle Cycle," and a "Regular Cycle" as shown on the rotatable dial 15 in FIG. 7 and which dial is located on the background of the machine in view of the machine operator. As noted in FIG. 7, and as will be more particularly described in the later explanation of the electric control circlit diagram of FIG. 9 and the diagrammatic timing chart of FIG. 8, the "Gentle Cycle," or program, provides sequentially for (reading in clockwise direction) "Wash," "Spin," "Rinse," "Spin," and "Off" positions, the "Regular Cycle," or program, also provides sequentially for "Off," "Wash," "Spin," "Rinse," "Spin," and "Off" positions. As the sequential controller 12 is a timing device and the dial is divided therefor in accord with increments of time so that a definite period of time will be necessary to elapse for each of the aforesaid positions, it will be observed that the "Gentle Cycle" or program is considerably less time-consuming than the "Regular Cycle." It will also be observed that a "Soak Cycle" or program is available to the machine operator and having a "Wash" and "Spin" operation (see FIG. 8). Thus, the sequential controller 12 can provide any one of these cycles or programs by its switches and its switch-operating and timing cams controlling the various mechanical and electrical components of the washing machine.

Although the controller 12 has been selected to illustrate a timer capable of performance to provide control of the described washing machine programs, the controller may be of any other commercially available type suitable for this purpose. Accordingly, by way of example for disclosure purposes, the timer 12 may be of the type shown and described in U.S. Patent 2,703,347, issued March 1, 1955 to A. R. Constantine. Briefly described, the timer 12 comprises a housing 14 having mounting bosses 15 extending outwardly thereof for supporting the construction in the backguard of the machine. A motor mounting plate 16 is fixed to the housing 14 and supports a motor 17. The motor 17 is provided with an output drive shaft 18 (FIG. 3) extending through an opening 19 in the plate 16. The shaft 18 carries a motor cam 20 fixed to its outer free end, the cam having a desired number of rising lobes to accomplish a predetermined motion. The motor cam engages and swings the free end of a cam follower 21 about a shaft 22 rotatably supported in the housing. The cam follower is held against the motor cam by a cam follower spring 24 disposed between and engageable with the cam follower 21 and a pin 25 carried by the motor mounting plate 16. A pawl-actuating lever 26 is fixed to and swingable on shaft 22 whereby members 21, 22, and 26 function as an integral bell crank. The lever carries an actuating pawl 27 which is fixed at one end thereof by a pin 28. An actuating pawl spring 29 is disposed between a shoulder 30 of the member 26 and the pawl 27, nesting over a pin 31 projecting outwardly from the pawl. The spring urges the pawl forwardly so that the free end 32 thereof bears against ratchet teeth 33 on the peripheral edge of the timing cam 34. When the cam follower 21 is released to be actuated by spring 24, the actuating lever 26 and pawl 27 are simultaneously actuated to rotate cam 34 counterclockwise in a step-by-step manner. A detent pawl 35 is swingable on an eccentric 36 rotatably adjustable on a post 37 secured to the housing. The finger 39 of pawl 35 is engageable with the teeth of the timing cam 34 and is urged radially inward thereagainst by a detent pawl spring 40. This eccentric arrangement permits adjustment of the pawl relative to the incremental movements of the timing cam so that the pawl not only holds the timing cam in the exact position but also prevents any movement thereof during the return motion of the actuating pawl.

It will be noted the back angle of pawl 35 impinges on the face of the ratchet teeth 33 when dropping into position and prevents overtravel. The timing cam 34 is mounted on a timing cam shaft 41 extending therethrough and journaled in bearings of the housing. The cam, cam shaft, and the dial 15 rotate in a clockwise direction as seen in FIGS. 1 and 4. The shaft 41 has its outer extremity 42 extending outwardly and away from one side of the housing and carries an indicating and manually adjustable knob 43 (FIG. 1) having the dial 15 and shaft 41 rotatable therewith.

The timing cam 34 is made of insulating material and is provided on its opposite faces with a plurality of concentrically disposed radially spaced arcuate cam tracks 44 having various length segments so as to provide and conform to the cam sequence chart of FIG. 8 to afford the necessary "On" and "Off" periods for electric circuit-making and breaking contacts of the switches SW1–11 shown in FIG. 8 and the electrical control circuit diagram of FIG. 9.

In operation, the motor cam 20 raises the cam follower 21 intermittently upon rotation thereof. As the motor cam continues its motion, the cam follower drops off the high point of the cam and the stored energy in the cam follower spring 24 causes the follower to swing rapidly in the opposite direction thereby moving the pawl actuating lever 26 connected integrally to it which in turn causes the actuating pawl 27 through its finger 32 to move a cam tooth 33 along a predetermined arc. The detent pawl 35 holds the timing cam in position during the backward or return movement of the actuating pawl 27. The detent pawl 35 readily allows the greater force of the actuating pawl to urge the timing cam forwardly whereupon the detent pawl readily falls into the succeeding locking position.

Rotation of the cam 34 by the motor 17 causes the cam tracks 44 to actuate switches SW1–11 located on opposite sides of the cam and mounted on the housing 14, operation of the cam causing contacts of each switch to open and close circuits, in accordance with the cam tracks' location and length, to various electrically-operable and controlled components of the automatic washer to provide the various programs, "Regular Cycle," "Gentle Cycle," and "Soak Cycle," identified on the dial of the control C and visibly apparent to the operator. The electrically-operable and controlled components of the washer are identified diagrammatically in the electrical control circuits of FIG. 9, as well as the switches SW1 to SW11 inclusive, controlling these components in definite sequential programs as the switches are actuated by the cam tracks diagrammatically shown in FIG. 8. As can be seen in FIGS. 8 and 9, a plurality of cam tracks 44 are respectively alphabetically indicated from A to O, inclusive, for actuating the switches to provide definite time periods for functioning of the various electrically-operable and controlled components of the machine during the selection of one of the programs by the operator effecting rotation of the dial to a position initiating operation of either the "Regular Cycle," "Gentle Cycle," or "Soak Cycle," thereby completing electrical energizing circuits, including a circuit to the sequential controller motor 17.

In view of the above description, it will be apparent from consideration of FIGS. 8 and 9 that a multiplicity of programs are provided respectively controlled by the sequential controller effecting operation of its switches in predetermined sequences, as determined by the program selection by the operator, and in accordance with the operation of the switches by the cam tracks of the sequential controller during the selected program.

The present invention is directed to a new and improved control arrangement for domestic appliances, such as an automatic washer, having a multiplicity of automatic sequential operations in the form of a single program, or a plurality of such programs, and featuring means for varying or changing operations of a single program, or changing a previously selected program to another program, or changing selectively any operation of one program to an operation of another program, at any time by the operator and at the will of the operator during performance of the appliance.

For this purpose, the sequential controller 12 is particularly adapted for combination with the new and novel control arrangement as the cam 34 may be continuously rotated in one direction during the operation of the controller in the performance of a selected program for positioning at any desired step of any program by the control arrangement. More particularly, and as shown in FIGS. 2, 3, and 4, the control arrangement includes a rapid advance motor 45 of the shaded pole type and having a rotor armature 46 capable of moving axially and also rotatable in conventional manner. The armature 46 is normally biased by a coil spring 47 along its longitudinal axis away from a gear casing 48. Upon energization of the motor 45, the armature 46 moves toward the gear casing 48 to engage a pinion 49 on the armature shaft 50 with a gear 51 of a gear train to drive the gear 51. The gear 51 has its teeth meshing with teeth on a gear 52 on a shaft 53 rotatably mounted in the casing 48. Rotation of the gear 52 and shaft 53 is effective to rotate a gear 54 secured to the shaft 53. The gear 54 has its teeth meshing with the teeth on gear 55 secured to the end of shaft 41 projecting outwardly of the timer housing 14. It will be apparent from an inspection of FIGS. 2 and 4, that, upon energization of the motor 45, the gear train will be effective to rapidly rotate the timer shaft 41 and thereby the switch-controlling cam 34 and dial 15 at high speed. Upon deenergization of the motor 45, spring 47 will move the armature shaft 50 to disengage pinion 49 from the gear 51 so that rotation of shaft 41 is immediately terminated.

A switch, indicated as SW(PB), in FIGS. 2 and 9, is provided to control energization of the rapid advance motor. The switch is of the double throw type and has its movable spring contact $b$ normally biased to engage the contact $a$ by the force exerted on the contact $b$ by shaft 50 through the medium of spring 47 to provide an electric circuit to energize the timer motor 17, assuming the cams of the timer are operative to close a line switch (SW1) in series with closed contacts $a$ and $b$ to complete the circuit as will be later described. The contact $b$ is movable to disengage contact $a$ and engage contact $c$ upon actuation of the pushbutton PB (FIG. 1) on the backguard of the washing machine to thereby complete an electric circuit effective to energize the rapid advance motor 45. It will be noted that movement of the pushbutton will not only close contacts $b$ and $c$ of the switch to complete an electrical circuit to energize the rapid advance motor, but will also be effective to axially move shaft 50 to engage pinion 49 thereof with gear 51 to rapidly rotate the timer cam 34. In this respect, the motor 45 is energized by an electric circuit including line L1 of a power source, closed contacts $b$ and $c$ of switch SW(PB), conductor C1 connected to a terminal of the motor 45, and line L2 of the power source connected to a terminal of the motor. Upon release of the pushbutton PB, the spring 47 is effective to move shaft 50 to disengage the pinion 49 from its driving relation to the gear 51 and thereby timer cam 34, and also to disengage contacts $b$ and $c$ and re-engage contacts $a$ and $b$.

Referring to the electrical circuit diagram of FIG. 9, the switch SW(PB) is effective to control completion of electrical circuits to either the rapid advance motor 45 or to the timer motor 17, i.e., when the switch contacts $a$ and $b$ are normally closed, a circuit can be completed to the time motor, but such closure requires the contacts $b$ and $c$ to be disengaged so that there is no possibility of simultaneously completing an electrical circuit to the rapid advance motor 45. Conversely, whenever the pushbutton PB is actuated by the machine operator at any time prior to, or during, operation of the timer 12, a circuit can only be completed to the rapid advance motor 17 which then, through the described mechanical gear arrangement, rotates the timer motor shaft 41 to position the cam 34 in a desired location as indicated by the dial 15 on the backguard of the machine, release of the pushbutton causing re-establishment of the circuit to the timer motor for continued operation of the timer motor and cam 34 for a desired portion of a selected program, while interrupting the circuit to the rapid advance motor 45.

Referring now to FIGS. 8 and 9, respectively, illustrating diagrammatically the timing chart and electrical control circuits for the various programs of the automatic washer, it will be noted that the different programs correspond to and have operations identical with those indicated on the dial 15 so that the operator is aware and readily recognizes the programs and particular portion of a selected program that the sequential controller 12 is to control, or is presently controlling, by the cam tracks' engagement with the electrical circuit controlling switches operated thereby.

The conventional programs, controlled by the sequential controller 12, as shown in FIGS. 8 and 9 are believed to be readily understandable and apparent by persons cognizant of the art, and, accordingly, a review of these programs does not appear to be necessary, each of the programs have clearly indicated functions, as shown in FIG. 8, as effected by the control of the sequential controller cam tracks and their operation in closing and opening the variously identified switches to initiate and continue the operations of the selected program. The water-fill period of each program is initiated by the controller and terminated by a pressure switch SW13. The controller is also effective to energize and deenergize a brake solenoid BS through actuation of switch SW8 to control operation of the automatic washer agitator and basket drive arrangement in the manner set forth in U.S. Patent 2,807,951.

It will be apparent that the novel control arrangement is capable of permitting the operator, at will, to initiate the operation of any program, to change to any other operation of the selected program, or to change to another program or any portion thereof during operation of the machine, so that an infinite number of variations of washing operations may be obtained while insuring the conventional sequential controller is then immediately operative to continue the operations of the selected programs to conclusion.

The present control arrangement is important in the complete versatility of the appliance performance to conform to the desires of the operator. The operator may elect, at any time, to change to a different program, or to a selected portion of any program, by merely operating the pushbutton to close the circuit to the rapid advance motor and, as the cam portion of the sequential controller can rotate continuously in a clockwise direction as long as the pushbutton is depressed, the operator can vary or change a presently existing operation to any other operation or a portion of another operation and, upon release of the pushbutton, have the assurance that the sequential controller will take over and complete the selected operation. For example, should the appliance be operating in the 8 minute period of "Wash" in "Regular Cycle," the operator may depress the pushbutton to select the four minute period, or the "Spin" or "Rinse" setting; or, if desired, may cause rotation of the dial to select the "Spin" setting of the "Gentle Cycle." Also, should the operator desire 20 minutes of "Wash" time in the "Regular" cycle, she may, at the expiration of the 10 minute period shown, depress the pushbutton to rotate the dial to the "10" setting to obtain an additional wash period. Also, the operator may shorten or lengthen the different operations of the appliance, for example, by effecting rotation of the dial to a position commensurate with the desired time period.

While the invention has been described and illustrated with reference to an automatic washer, it is believed to be adaptable to other household appliances including automatic dryers and the like. Accordingly, it will be apparent to those skilled in the art that various changes and modifications may be made as contemplated by the scope of the appended claims.

What is claimed is:

1. In a control arrangement for a household appliance, the combination of sequence control means providing selectable operations of the appliance; first control circuits operated by the sequence means; means for advancing the sequence means at timing speed during a first selected operation; a second control circuit for energizing said advancing means; means for advancing the sequence means at higher speed; and selector means manually controllable to deenergize said first and second control circuits during said first operation to discontinue said first operation and to actuate said high speed advancing means to advance said sequence means to select a second operation, and said selector means being manually controlled thereafter to deenergize said high speed advancing means and to energize said first and second control circuits to advance the sequence means for the performance of the second operation.

2. In a control arrangement for a household appliance, the combination of sequence control means providing a plurality of selectable operations of the appliance and including cam means; and switches operable by said cam means; means for advancing the cam means at timing speed during said operations; a control circuit for energizing said advancing means; means for advancing the cam means of said sequence means at higher speed; and manually controlled means operative to deenergize said control circuit during a selected operation to discontinue the selected operation and to actuate said high speed advancing means to advance said cam means to select a second operation, said manually controlled means being operated thereafter to deenergize said high speed advancing means and to energize said control circuit to advance the cam means for the performance of the second operation.

3. In a control arrangement for a household appliance, the combination of sequence control means providing a plurality of selectable operations of the appliance; means for advancing the sequence means at timing speed during a first selected operation; a control circuit for energizing said advancing means; a dial having indicia visibly identifying the selectable operations and advanceable with said sequence means; means for advancing the sequence means and thereby the dial at higher speed; and manually controlled means operative to deenergize said control circuit during performance of said first operation indicated on said dial to discontinue said first operation and to actuate said high speed advancing means to advance said sequence means to establish a second operation indicated on said dial, said manually controlled means thereafter being operated to deenergize said high speed advancing means and to energize said control circuit to advance the sequence means for the performance of the second operation.

4. In a control arrangement for a household appliance, the combination of sequence control means providing selectable first and second operations of the appliance and including rotatable cam means and switches selectively operable by the cam means; means for rotating the cam means at timing speed during a first selected operation; a control circuit for energizing said rotating means; a dial rotatable with said cam means and having indicia visibly identifying the selectable operations; means for rotating the cam means and dial at higher speed; and manually operated means to deenergize said control circuit during said first operation indicated on said dial to discontinue said first operation and to actuate said high speed rotating means to rotate said cam means to establish a second operation indicated on said dial, said manually-operated means thereafter being operated to deenergize said high speed rotating means and to energize said control circuit to rotate the cam means for the performance of the second operation.

5. In a control arrangement for a household appliance, the combination of sequence control means providing a plurality of selectable operations of the appliance; means for advancing the sequence means at timing speed during said operations; means for visibly indicating the sequences of said operations and advanceable with said sequence means during energization of said advancing means; a control circuit for energizing said advancing means to initiate performance of a selected operation identified on said indicating means; means for advancing the sequence means at higher speed; and means operative, including manual means operated from different time periods to deenergize said control circuit during said selected operation to discontinue said selected operation and to actuate said high speed advancing means to advance said sequence means to select a second operation as identified on said indicating means, said manual means thereafter again being operated to deenergize said high speed advancing means and to energize said control circuit to advance the sequence means for the performance of the second operation.

6. In a control arrangement for a household appliance, the combination of sequence timing control means including rotatable cam means and switches operable by the cam means to provide a plurality of operations of the appliance; means for rotating the cam means at timing speed to selectively actuate said switches by said cam means to provide a first appliance operation; a control circuit for energizing said rotating means; means for rotating the cam means at higher speed; and first control means operated manually to deenergize said control circuit and thereby said rotating means to interrupt said first operation and to actuate said high speed rotating means to select a second appliance operation and second control means operated manually, after manual operation of said first control means, to select the second appliance operation, to energize said control circuit to rotate the cam means to provide said second appliance operation.

7. In a control arrangement for a household appliance, the combination of sequence control means providing a plurality of operations of the appliance and including rotatable cam means; and switch means selectively controlled by said cam means; means for rotating the cam means at timing speed to operate said switch means for predetermined time periods of a first appliance operation; a control circuit for energizing said rotating means; means for rotating the cam means at higher speed; and first manual means operative to deenergize said control circuit after an elapsed time period of said first operation to discontinue said first operation and to actuate said high speed rotating means to rotate said cam means to a previous position within the elapsed time period of said first operation, and second manual means operated after said first manual means, to inactivate said high speed rotating means and to energize said control circuit to rotate the cam means at timing speed.

8. In a control arrangement for a household appliance, the combination of electrical control means for said appliance; a sequential timer having switch means for establishing circuits energizing said electrical control means, timing control means for controlling said switch means to provide selectable different operations of said electrical control means, and a timing motor energizable for driving said timing means through a selected operation at slow speed; rapid advance means for advancing said timing means at high speed and including a motor; first manually-operated means controlling energization of said motors and said electrical control means and operative to deenergize said timing motor and said electrical control means during the performance of said selected operation to thereby terminate said selected operation and to energize said rapid advance means motor to advance said timing means to select and initiate a second operation, and second manual means operated subsequent to said first manually-operated means to deenergize said rapid advance means motor and to re-energize said timing motor and said electrical control means to initiate performance of the second operation.

9

9. In a control arrangement for a household appliance, the combination of electrical control means for said appliance; a sequential timer having switch means for establishing circuits energizing said electrical control means, rotatable timing control cam means for controlling said switch means to provide selectable different operations of said electrical control means, and a timing motor energizable for rotating said cam means through a selected operation at slow speed; rapid advance means for rotating said cam means at high speed and including a motor; first manually-operable means controlling energization of said motors and said electrical control means and operative to deenergize said timing motor and said electrical control means at any time during the performance of said selected operation to thereby terminate said selected operation and to energize said rapid advance means motor to rotate said cam means to select and initiate a second operation; and second manually-operable means manually actuatable, subsequent to operation of said first manually-operable means to deenergize said rapid advance means motor and to re-energize said timing motor and said electrical control means to rotate said cam means to initiate performance of the second operation.

10. In a control arrangement for a household appliance, the combination of electrical control means for said appliance; a sequential timer having switch means for establishing circuits energizing said electrical control means, timing control means for controlling said switch means to provide selectable different operations of said electrical control means, and a timing motor energizable for driving said timing means through a selected operation at slow speed; a circuit for energizing said timing motor; rapid advance means for advancing said timing control means at high speed and including a motor; and circuit means for energizing said rapid advance means motor; and a switch manually-operable for controlling said circuits and said circuit means and operative to interrupt said circuits to deenergize said timing motor and said electrical control means during the performance of said selected operation and to establish said circuit means to energize said rapid advance means motor to advance said timing means to select a second operation, said switch being thereafter manually operative to interrupt said circuit means to de-energize said rapid advance means motor and to re-establish said circuits to re-energize said timing motor and said electrical control means to initiate performance of the second operation.

11. In a control arrangement for a household appliance, the combination of electrical control means for said appliance; a sequential timer having switch means for establishing circuits energizing said electrical control means, rotatable timing control cam means for controlling said switch means to provide selectable different operations of said electrical control means, a timing motor energizable for driving said cam means through a selected operation at slow speed, a circuit for energizing said motor; rapid advance means for advancing said timing control means at high speed and including a motor, and circuit means for energizing said rapid advance means motor; and a two-position switch controlling said circuits and said circuit means and operative in a first position thereof to interrupt said circuits to deenergize said timing motor and said electrical control means during the performance of said selected operation, and in a second position thereof to establish said circuit means to energize said rapid advance means motor to rotate said cam means to select a second operation, said switch being thereafter operative to the second position to interrupt said circuit means to deenergize said rapid advance means motor and to re-establish said circuits to re-energize said timing motor and said electrical control means to initiate performance of the second operation.

12. In a control arrangement for a household appliance, the combination of electrical control means for said appliance; a sequential timer having switch means for establishing circuits energizing said electrical control means, timing control means for controlling said switch means to provide selectable different operations of said electrical control means, a timing motor energizable for driving said timing control means through a selected operation at slow speed, and a circuit for energizing said motor; rapid advance means for advancing said timing control means at high speed and including a motor, and circuit means for energizing said rapid advance means motor; and a manually-operable two-position switch arranged in parallel relation with said circuits and said circuit means and operative in a first position thereof to interrupt said circuits and to establish said circuit means to de-energize said timing motor and said electrical control means during the performance of said selected operation and to energize said rapid advance means motor to advance said timing control means to select a second operation, said switch being operative in the second position thereof to interrupt said circuit means to de-energize said rapid advance means motor and to re-establish said circuits to re-energize said timing motor and said electrical control means to initiate performance of the second operation.

13. In a control arrangement for a household appliance, the combination of electrical control means for said appliance; a sequential timer having switch means for establishing circuits energizing said electrical control means, timing control means for controlling said switch means to provide selectable different operations of said electrical control means, a dial connected to said timing control means and having indicia identifying said operations; a timing motor energizable for driving said timing control means and thereby said dial through a selected operation at slow speed; rapid advance means for advancing said timing control means at high speed and including a motor; and means controlling energization of said motors and said electrical control means and manually operative to deenergize said timing motor and said electrical control means during the performance of said selected operation indicated on said dial and to energize said rapid advance means motor to advance said timing control means and said dial to select a second operation indicated on said dial, said controlling means being thereafter manually operative to deenergize said rapid advance means motor and to re-energize said timing motor and said electrical control means to initiate performance of the second operation.

14. In a control arrangement for a household appliance, the combination of electrical control means for said appliance; a sequential timer having switch means for establishing circuits energizing said electrical control means, timing control means for controlling said switch means to provide selectable different timed operations of said electrical control means, a dial connected to said timing control means and having indicia identifying said operations; a timing motor energizable for driving said timing control means and thereby said dial through a selected operation at slow speed, a circuit for energizing said motor; rapid advance means for advancing said timing control means and thereby said dial at high speed and including a motor, circuit means for energizing said rapid advance means motor, said circuits being arranged in parallel with said circuit means; and a two-position switch operative in one position thereof to interrupt said circuits and to establish said circuit means to deenergize said timing motor and said electrical control means during the performance of said selected operation and to energize said rapid advance means motor to advance said timing control means and said dial to select a second operation indicated on said dial, said switch then being movable to its second position to interrupt said circuit means and to re-establish said circuits to de-energize said rapid advance means motor and to re-energize said timing motor and said electrical control means to initiate performance of the second operation.

15. In a control arrangement for a washing machine, the combination of sequence timing control means including rotatable cam means continuously rotatable about an axis and having first and second cam sections circumferentially spaced in the order named about the axis of rotation of the cam means and respectively controlling selectable cycles of operations of the washing machine, each cycle including wash, spin, and rinse operations; first control circuits including switches operable by the cam means; means for rotating the cam means at timing speed to actuate said switches by said second cam section to provide a first selected cycle of operations; a second control circuit for energizing said rotating means; means energizable for rotating the cam means at higher speed; and first means manually-operated to deenergize said first and second control circuits at any time during performance of an operation of said first cycle to thereby deenergize said rotating means and interrupt said first cycle and to energize said high speed rotating means to rotate said cam means to position said first cam section in operative relation to said switches to establish one of said operations of said second cycle, and second means manually-operative, after operation of said first manually-operated means to energize said first and second control circuits to rotate the cam means for operation of said switches by said first cam section for performance of said one operation of said second cycle.

References Cited by the Examiner
UNITED STATES PATENTS

| | | | |
|---|---|---|---|
| 2,391,718 | 12/1945 | Lindemann | 307—141.4 |
| 2,995,143 | 8/1961 | Strathearn et al. | |
| 3,011,079 | 11/1961 | Mellinger | 307—141.4 |
| 3,033,999 | 5/1962 | Thornbery et al. | 307—141.4 |
| 3,089,994 | 5/1963 | Williams | 307—141.4 X |
| 3,215,867 | 11/1965 | Mellinger | 307—141 |

ORIS L. RADER, *Primary Examiner.*

LLOYD McCOLLUM, *Examiner.*

W. M. SHOOP, T. B. JOIKE, *Assistant Examiners.*